(12) United States Patent
Feenstra

(10) Patent No.: US 9,153,157 B2
(45) Date of Patent: Oct. 6, 2015

(54) DISPLAY DEVICE AND DISPLAY APPARATUS

(75) Inventor: Johannes Feenstra, Nuenen (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/433,993

(22) Filed: Mar. 29, 2012

(65) Prior Publication Data

US 2012/0256940 A1    Oct. 11, 2012

Related U.S. Application Data

(63) Continuation of application No. PCT/EP2010/065508, filed on Oct. 15, 2010.

(30) Foreign Application Priority Data

Oct. 16, 2009  (GB) .................................. 0918147.0

(51) Int. Cl.
| | |
|---|---|
| G09G 5/02 | (2006.01) |
| G09G 5/10 | (2006.01) |
| G09G 3/20 | (2006.01) |
| G02F 1/1333 | (2006.01) |
| G09G 3/34 | (2006.01) |

(52) U.S. Cl.
CPC ...... G09G 3/20 (2013.01); *G02F 2001/133391* (2013.01); *G09G 3/3406* (2013.01); *G09G 2300/0443* (2013.01); *G09G 2300/0456* (2013.01); *G09G 2310/0221* (2013.01); *G09G 2310/0235* (2013.01)

(58) Field of Classification Search
CPC .......... G02F 2001/133391; G09G 2300/0443; G09G 2300/0456; G09G 2310/0221; G09G 2310/0235; G09G 3/20; G09G 3/3406
USPC .......................................................... 345/589
See application file for complete search history.

(56) References Cited

U.S. PATENT DOCUMENTS

| | | |
|---|---|---|
| 6,747,619 B1 | 6/2004 | Tanahashi et al. |
| 2004/0207568 A1* | 10/2004 | Ooshima et al. ................ 345/1.1 |
| 2006/0268197 A1* | 11/2006 | Valliath et al. .................. 349/96 |
| 2006/0290652 A1* | 12/2006 | Zhou et al. ..................... 345/107 |
| 2007/0200985 A1 | 8/2007 | Kaneko et al. |
| 2008/0284926 A1 | 11/2008 | Akiyama |
| 2009/0009527 A1 | 1/2009 | Kuga et al. |
| 2010/0020276 A1* | 1/2010 | Jepsen .......................... 349/106 |

FOREIGN PATENT DOCUMENTS

| | | |
|---|---|---|
| CN | 1790139 A | 6/2006 |
| CN | 101142514 A | 3/2008 |
| EP | 1603108 A1 * | 12/2005 |
| EP | 1672411 A2 | 6/2006 |
| WO | 2009055621 A1 | 4/2009 |

* cited by examiner

*Primary Examiner* — Mark Zimmerman
*Assistant Examiner* — Sohum Kaji
(74) *Attorney, Agent, or Firm* — BainwoodHuang

(57) ABSTRACT

A display device has a set of picture elements, one active matrix and a display area, the display area including a first area and a non-overlapping second area, the first area comprising monochrome picture elements, and the second area comprising color picture elements.

19 Claims, 1 Drawing Sheet

DISPLAY DEVICE AND DISPLAY APPARATUS

FIELD OF THE INVENTION

The present invention relates to a display device and a display apparatus including the display device and a display driving system.

BACKGROUND OF THE INVENTION

Monochrome display apparatuses designed for reading text, such as the so-called e-readers, include a display device having a high resolution and a high brightness. There is a demand for displaying colour images on such display apparatuses without reducing the resolution and brightness. The problem is addressed by a known display apparatus having two display devices, one black-and-white display device for displaying text matter and one transmissive colour display device for displaying colour images.

A disadvantage of this solution is the added complexity of requiring two display devices and two display driving systems.

It is an object of the invention to provide a less complex display apparatus and a display device for use in such an apparatus.

SUMMARY OF THE INVENTION

In accordance with the present invention, there is provided a display device having a plurality of picture elements, one active matrix and a display area, the display area including a first area and a non-overlapping second area, the first area comprising monochrome picture elements, and the second area comprising colour picture elements.

The display area is divided in two areas, a first area with only monochrome display capability and a second area with colour capability. The second area has a lower resolution and/or a lower brightness than the first area as a consequence of the ability to display colours, because usually a picture element in a colour display is divided into three or more sub-picture elements, one for each colour. The division of the display area according to the invention provides a first area with high brightness and high resolution, which is very suitable for displaying text matter. The second area can be used for displaying any coloured matter of content such as magazines, newspapers and educational matter. The monochrome is preferably black-and-white for reading text matter.

It is the insight of the invention not to use the colour capability of the entire display area but to recognize that a display device having only a limited area with colour capability provides an area with improved resolution and brightness for reading black-and-white content. Such a display device is eminently suitable for an e-reader. The display device according to the invention provides colour images in a relatively simple manner without compromising the front of screen quality of the monochrome region of the display area.

The display device according to the invention can be used with many display technologies. Preferred technologies are electro-wetting, liquid-crystal, organic light-emitting-diodes, electrophoretic or MEMS-based technologies.

It should be noted, that stacked, multi-layer display devices also provide high brightness and resolution colour performance while maintaining also high brightness monochrome performance. The major drawback of such devices is the complex process engineering and system engineering caused by the stacked layers.

The display driver system may be provided with an image parser for dividing a mixed colour/monochrome image into a monochrome image and a colour image for display in the first area and second area, respectively. Such a redistribution of the content allows making optimal use of the display device.

Further features and advantages of the invention will become apparent from the following description of preferred embodiments of the invention, given by way of example only, which is made with reference to the accompanying drawings.

DETAILED DESCRIPTION OF THE INVENTION

Figure 1:
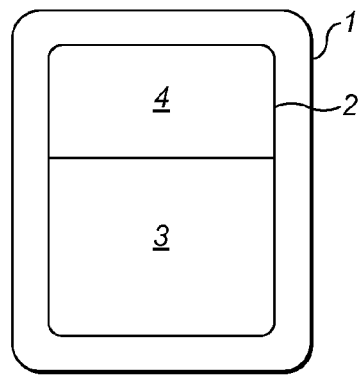
FIG. 1 shows a display apparatus.

FIG. 1 shows a display apparatus 1 having a display area 2 on which images can be displayed. The display area 2 is divided in a first area 3 and a second area 4. The area 3 comprises monochrome picture elements, e.g. black-and-white picture elements. The area 4 comprises colour picture elements. The relative size of the areas 3 and 4 depends on the application of the display apparatus. An application for children's content would preferably have a second area 4 for colour images of at least two-thirds of the size of the display area 2. Where the content relates more to business, a size of the second area 4 is preferably one quarter of the size of the display area 2 or less.

Figure 2:
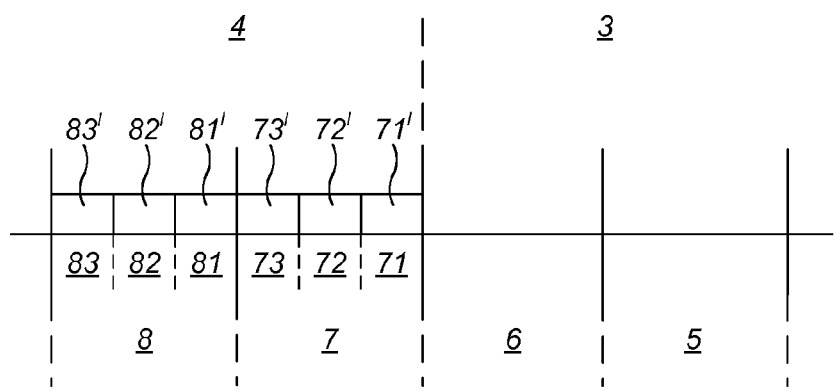
FIG. 2 shows a cross-section of picture elements.

The display area 2 is formed by a display device having a plurality of picture elements, the display state of which is controlled by a display driving system in an active-matrix configuration. The display device comprises the plurality of picture elements and supports, e.g. in the form of two plates between which the picture elements are arranged. FIG. 2 shows a cross-section of picture elements in the display device. Picture cells 5 and 6 are black-and-white picture cells lying in the first area 3; picture cells 7 and 8 are colour picture cells lying in the second area 4. The picture cells 7 and 8 are divided into sub-picture cells 71, 72, 73, 81, 82 and 83. Each sub-picture element includes a colour filter. Filters 71' and 81' are red, filters 72' and 82' are green and filters 73' and 83' are blue. The display area of the display apparatus shown has the same resolution in area 3 and area 4, but the brightness in area 4 will be lower than in the area 3. If each sub-picture element in area 4 has the same extent as the picture elements in area 3, the brightness of the picture elements will be increased at the cost of a reduced resolution.

The display device may be of a transmissive type, each (sub-)picture element transmitting or absorbing light, and having a backlight device attached to the display device. The display device may also be of a reflective type, each (sub-)picture element reflecting or absorbing light. The light controlling element for each picture element 5, 6 and for each sub-picture element 71, 72, 73, 81, 82, 83 depends on the technology used for the display device. When using electro-wetting, each (sub-)picture cell includes two fluids the configuration of which, and thereby the transmission of light, can be electrically controlled. Reference is made to international patent application WO 2009/004042 for details of the technology. The light through the (sub-)picture element may also be controlled by a liquid-crystal cell, where the transmission of the liquid-crystal cell is electrically controlled. The transmission may also be controlled by an e-ink cell. In a display device using light-emitting-diodes each of the filters in FIG. 2 is replaced by a light-emitting-diode emitting the desired colour of light and the brightness is controlled by the current through the diodes.

FIG. 1 shows the first area 3 with monochrome picture elements at the bottom of the display area 2. The first area 3 may be anywhere within the display area 2. In a landscape-oriented display area 2 the first area 3 may be arranged on the left- or right-hand side of the display area 2.

The colour filters in FIG. 2 may be of any type: RGB, RGBW, RGBx.

The colour filers may be arranged on the same substrate on which the active matrix, i.e. the electrodes for controlling the brightness of the picture elements, are arranged; this is commonly called 'colour filter on array' (COA). This arrangement has the advantage that the crossover between colour and monochrome areas will be very sharp.

When using backlight, a time-sequentially switched RGB backlight may be used in the second area 4 or in both areas 3 and 4. This may be used in combination with a transmissive or a transflective display device. Details about the latter are provided in international application WO2007/014121.

Figure 3:
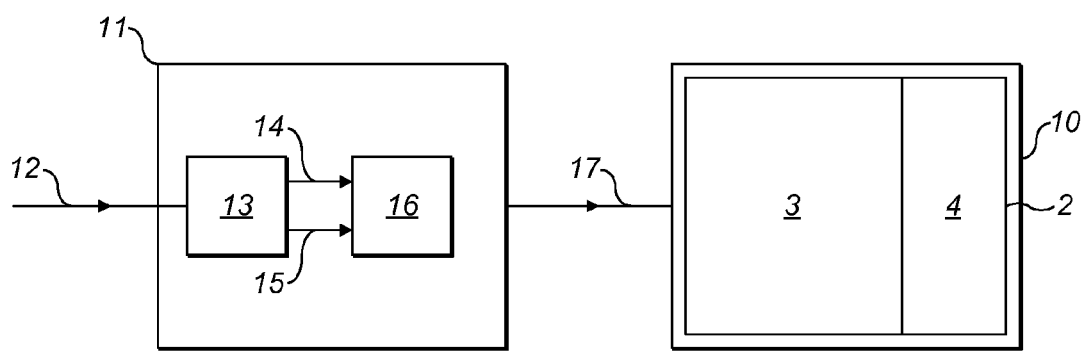
FIG. 3 shows a display device and a display driving system.

FIG. 3 shows a display apparatus including a display device 10 having the display area 2 and a display driving system 11. A signal 12 representing images to be displayed is input to the display driving system. The signal is input in an image parser 13 for dividing an incoming mixed colour/monochrome image into a monochrome image output via signal 14 and a colour image output via signal 15. The signals 14 and 15 are input in a combiner 16 that arranges the monochrome image to be displayed in the first area 3 and the colour image in the second area 4 of the display area 2.

The image content may be adjusted by an electronic circuit that recognizes the content and adjusts the image to be displayed to comply with the position of the first and second area.

The display driving system may be configured to display a monochrome image over the first and at least part of the second region, to accommodate cases where the extent of the colour image is smaller than the second area or where the amount of monochrome information requires more area than available in the first area. When there is no colour image to display, the monochrome image may extend over the combined first and second area.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A display apparatus including:
   a display device having:
   a plurality of picture elements;
   a display area including a first area and a non-overlapping second area, the first area comprising monochrome picture elements, and the second area comprising colour picture elements, the first area adjoining the second area;
   solely one active matrix configured to drive the monochrome picture elements and the colour picture elements; and
   a display driving system configured for driving the display device to display a monochrome image over the first area and at least part of the second area.

2. A display apparatus according to claim 1, wherein the display area has a top side and a bottom side, and the second area is arranged at the top side.

3. A display apparatus according to claim 1, wherein the display has a top side and a bottom side, and the first and second area are separated by a vertical dividing line.

4. A display apparatus according to claim 1, wherein the display device includes a backlight.

5. A display apparatus according to claim 4, wherein the picture elements in the second area contain a monochrome reflective part smaller than a reflective part in the picture elements in the first area and a transmissive part for transmitting light coming from the backlight.

6. A display apparatus according to claim 5, wherein the backlight is of the RGB type.

7. A display apparatus according to claim 6, wherein the display device is driven in the field sequential mode.

8. A display apparatus according to claim 1, wherein each of the colour picture elements includes a spatial colour filter.

9. A display apparatus according to claim 8, wherein the spatial colour filter is arranged as a colour filter on array.

10. A display apparatus according to claim 1, wherein the display device is one of an electro-wetting device, a liquid-crystal device, an organic light-emitting-diode device, an electrophoretic device or a MEMS-based device.

11. A display apparatus according to claim 1, wherein the display driving system includes an image parser for dividing a mixed colour/monochrome image into a monochrome image and a colour image for display in the first area and second area, respectively.

12. A display apparatus according to claim 1, wherein the display driving system is configured to display a monochrome image extending over a combination of the first and second area.

13. A display apparatus according to claim 1, wherein the display driving system is configured to adjust an image to comply with the position of the first and second area.

14. A display apparatus according to claim 1, wherein each monochrome picture element is a black and white picture element.

15. A display apparatus according to claim 1, comprising two plates between which are arranged the monochrome picture elements and the colour picture elements.

16. A display apparatus according to claim 1, wherein the one active matrix includes electrodes for controlling a brightness of the monochrome picture elements and the colour picture elements, the one active matrix being arranged on a single substrate.

17. A display apparatus according to claim 1, wherein the display driving system is configured to display the monochrome image over the first area and at least part of the second area in response to a determination that one or more of: a colour image for display is smaller than the second area, or the monochrome image for display is larger than the first area.

18. A display apparatus according to claim 1, wherein the display driving system includes a combiner for arranging the monochrome image to be displayed in the first area and part of the second area and a colour image to be displayed in another part of the second area.

19. A method of controlling a display device including:
   driving, using solely one active matrix of the display device, a first area and at least part of a non-overlapping second area of a display area of the display device to display a monochrome image, the first area adjoining the second area and comprising monochrome picture elements, and the second area comprising colour picture elements.

* * * * *